(12) United States Patent
Moriya et al.

(10) Patent No.: US 10,974,601 B2
(45) Date of Patent: Apr. 13, 2021

(54) BRAKING CONTROL DEVICE FOR VEHICLE

(71) Applicant: SUBARU CORPORATION, Tokyo (JP)

(72) Inventors: Fumiyuki Moriya, Tokyo (JP); Hiroshi Ienaga, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 331 days.

(21) Appl. No.: 15/792,534

(22) Filed: Oct. 24, 2017

(65) Prior Publication Data
US 2018/0178657 A1    Jun. 28, 2018

(30) Foreign Application Priority Data
Dec. 26, 2016 (JP) .............................. JP2016-250453

(51) Int. Cl.
*B60L 3/10* (2006.01)
*B60L 7/10* (2006.01)
(Continued)

(52) U.S. Cl.
CPC ................ *B60L 3/108* (2013.01); *B60L 7/10* (2013.01); *B60L 15/2009* (2013.01);
(Continued)

(58) Field of Classification Search
CPC ........ B60L 3/108; B60L 7/10; B60L 15/2009; B60L 2240/12; B60L 2240/423; B60L 2240/80; B60L 2250/26; B60L 2270/145; B60T 8/176; B60T 8/17616; B60T 13/741; Y02T 10/645; Y02T 10/7275
See application file for complete search history.

(56) References Cited

U.S. PATENT DOCUMENTS 6,717,381 B2 *   4/2004   Inagaki .................. H02P 25/098
                                                                318/432
7,075,263 B2 *   7/2006   Takemori ................ H02P 25/16
                                                                318/560

(Continued)

FOREIGN PATENT DOCUMENTS

JP         2002-171778 A      6/2002
JP         2005-297962 A     10/2005

*Primary Examiner* — Thomas E Worden
(74) *Attorney, Agent, or Firm* — McGinn I.P. Law Group, PLLC (57) ABSTRACT

A braking control device for a vehicle includes an anti-lock controller and a resonance controller. The anti-lock controller is configured to perform an anti-lock control that includes making an adjustment to the braking torque command, to cause suppression of one or more wheels from being locked during braking of the vehicle. The resonance controller is configured to correct the braking torque command, to control resonance of a power transmitter. The resonance controller includes a resonance generation processor that is configured to generate the resonance while imposing a limitation on magnitude of the resonance. The resonance controller is configured to suppress the resonance except during the anti-lock control, and allow the resonance generation processor to generate the resonance while imposing the limitation on the magnitude of the resonance during the anti-lock control.

12 Claims, 7 Drawing Sheets

(51) Int. Cl.
*B60T 13/74* (2006.01)
*B60T 8/176* (2006.01)
*B60T 8/1761* (2006.01)
*B60L 15/20* (2006.01)

(52) U.S. Cl.
CPC .......... *B60T 8/176* (2013.01); *B60T 8/17616* (2013.01); *B60T 13/741* (2013.01); *B60L 2240/12* (2013.01); *B60L 2240/423* (2013.01); *B60L 2240/80* (2013.01); *B60L 2250/26* (2013.01); *B60L 2270/145* (2013.01); *Y02T 10/64* (2013.01); *Y02T 10/72* (2013.01)

(56) References Cited

U.S. PATENT DOCUMENTS

| | | | |
|---|---|---|---|
| 7,495,403 B2* | 2/2009 | Soudier | H02P 21/05 |
| | | | 318/432 |
| 8,874,297 B2* | 10/2014 | Bang | B60L 15/2045 |
| | | | 701/22 |
| 9,158,300 B2* | 10/2015 | Miyazaki | H01M 10/44 |
| 9,407,162 B2* | 8/2016 | Kudoh | H02M 7/53873 |
| 9,919,605 B2* | 3/2018 | Osamura | B60L 15/20 |
| 10,017,185 B2* | 7/2018 | Lindberg | B60W 10/08 |
| 2002/0060545 A1* | 5/2002 | Inagaki | B60L 58/12 |
| | | | 318/629 |
| 2005/0234627 A1 | 10/2005 | Perach et al. | |
| 2005/0274560 A1* | 12/2005 | Wakao | B60L 3/102 |
| | | | 180/197 |
| 2006/0043788 A1* | 3/2006 | Schluter | B60T 13/72 |
| | | | 303/113.4 |
| 2016/0039397 A1* | 2/2016 | Kerber | B60T 8/172 |
| | | | 701/74 |
| 2016/0221468 A1* | 8/2016 | Suzuki | B60L 15/20 |

* cited by examiner

BRAKING CONTROL DEVICE FOR VEHICLE

CROSS-REFERENCE TO RELATED APPLICATIONS

The present application claims priority from Japanese Patent Application No. 2016-250453 filed on Dec. 26, 2016, the entire contents of which are hereby incorporated by reference.

BACKGROUND

The technology relates to a braking control device for a vehicle.

As a braking system for a vehicle, there has been previously an electrical braking system that electrically generates braking torque by, for example, power regenerative braking of a motor. Moreover, as the braking system for the vehicle, an anti-lock brake system (hereinafter abbreviated to "ABS") has been in practical use. The ABS prevents each wheel from being locked at the time of braking of the vehicle. Applying the ABS to the electrical braking system leads to enhancement in quietness, as compared to a case with application of the ABS to a mechanical brake. This causes difficulty for a driver in recognizing that the ABS is in operation.

Japanese Unexamined Patent Application Publication (JP-A) No. 2005-297962 discloses a configuration that includes applying the ABS to the electrical braking system and providing green-color display during the operation of the ABS, to give a warning to the driver. Moreover, JP-A No. 2002-171778 discloses a technique of extracting a resonance frequency component of a torque fluctuation, and suppressing vibration of this component, to prevent occurrence of resonance in the vehicle.

SUMMARY

As disclosed in JP-A No. 2005-297962, giving the driver the warning that the ABS is in operation makes it possible for the driver to recognize what to do to operate a brake pedal appropriately, when they intend for prompt braking of the vehicle. For example, the driver can recognize that they should keep on stepping down the brake pedal without pumping brake operation. However, the warning by the display as in JP-A No. 2005-297962 is difficult for the driver to recognize in the situation that involves sudden braking.

Moreover, in the case with the application of the ABS to the mechanical brake, it is known that during the operation of the ABS, adjustment operation of a hydraulic pressure causes vibration to be transmitted to the brake pedal. This has led the inventors of the technology to an idea that causing pseudo vibration of the brake pedal would make the driver appropriately recognize that the ABS is in operation, in a configuration with application of the ABS to an electrical brake. However, providing a new vibrator to cause the pseudo vibration of the brake pedal may cause disadvantages such as an increase in the number of components, an increase in component costs, and an increase in space for installation of the components.

It is desirable to provide a braking control device for a vehicle that makes it possible to make a driver appropriately recognize that an ABS is in operation without providing a new vibrator.

An aspect of the technology provides a braking control device for a vehicle. The braking control device is mounted on a vehicle including one or more wheels, at least one armature, and a power transmitter. The armature is configured to electrically generate braking torque on the basis of braking torque command. The power transmitter is configured to transmit the braking torque command generated by the armature to the one or more wheels. The braking control device includes an anti-lock controller and a resonance controller. The anti-lock controller is configured to perform an anti-lock control that includes making adjustment of the braking torque command, to cause suppression of the one or more wheels from being locked in braking of the vehicle. The resonance controller is configured to correct the required braking torque, to control resonance of the power transmitter. The resonance controller includes a resonance generation processor configured to generate the resonance while imposing a limitation on magnitude of the resonance. The resonance controller is configured to suppress the resonance except during the anti-lock control, and allow the resonance generation processor to generate the resonance while imposing the limitation on the magnitude of the resonance during the anti-lock control. The anti-lock control includes the adjustment of the braking torque command by the anti-lock controller.

DETAILED DESCRIPTION

First Implementation

Figure 1:
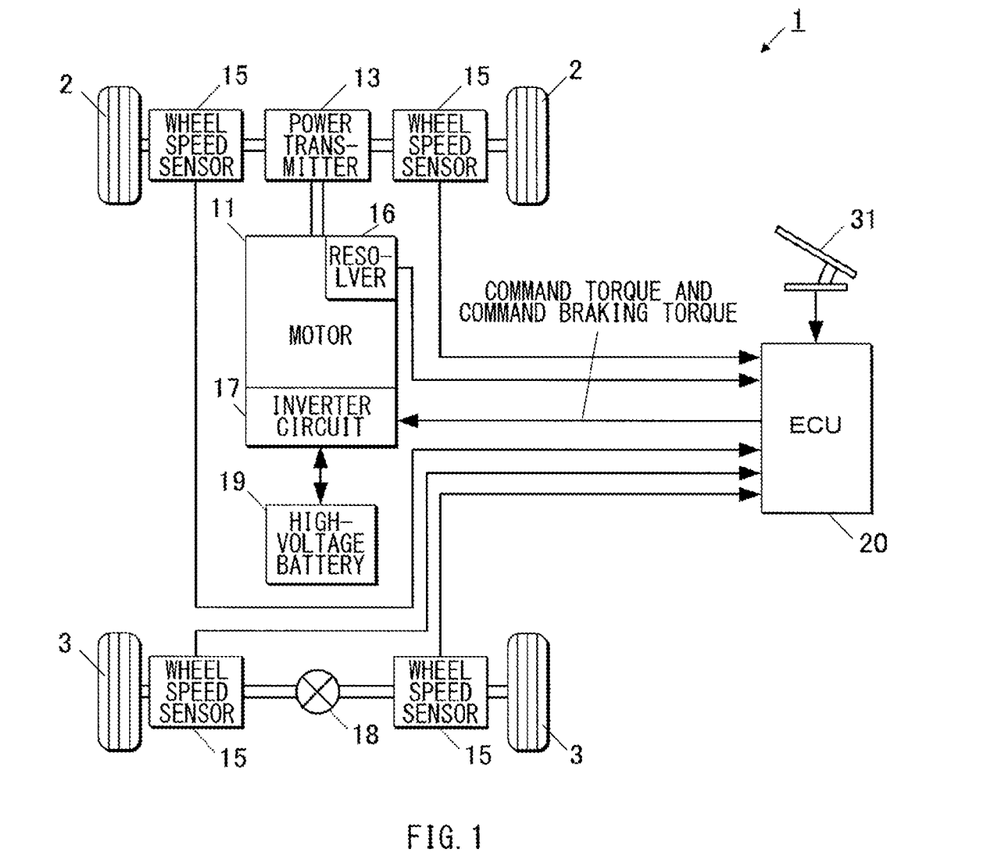
FIG. 1 is a block diagram that illustrates a configuration of a vehicle according to a first implementation of the technology.

In the following, some implementations of the technology are described in detail with reference to the drawings. FIG. 1 is a block diagram of a configuration of a vehicle according to a first implementation of the technology.

A vehicle 1 according to the first implementation of the technology may be, for example, an electric vehicle (EV), and include a plurality of front wheels 2 and a plurality of rear wheels 3, a motor 11, a power transmitter 13, and a driving operation unit 31. The vehicle 1 may further include wheel speed sensors 15, a resolver or an angle detector 16, an inverter circuit 17, a differential gear 18, a high-voltage battery 19, and an electric control unit (ECU) 20. The vehicle 1 may further include undepicted sensors that detect vehicle states other than a wheel speed, e.g., an acceleration sensor. Detection values of the sensors may be outputted to the ECU 20. In one implementation of the technology, the ECU 20 may serve as a "braking control device". In one implementation of the technology, the front wheels 2 and the rear wheels 3 may serve as "one or more wheels".

The motor 11 may incorporate an armature. The armature may generate motive power of the front wheels 2 in powering, and convert kinetic energy of the front wheels 2 into regenerative electric power in regeneration. Generation of the motive power of the front wheels 2 in the powering causes driving torque to be outputted to an output shaft of the motor 11 and to the front wheels 2. Generation of the regenerative electric power in the regeneration causes braking torque to be generated in the output shaft of the motor 11 and in the front wheels 2. Braking by the generation of the regenerative electric power is called power regenerative braking.

The power transmitter 13 may transmit the motive power of the motor 11 to the front wheels 2. The power transmitter 13 may include a transmission, a differential gear, and drive shafts. The drive shafts may include a drive shaft that couples together elements of the power transmitter 13, and a drive shaft coupled to the front wheels 2. The drive shaft coupled to the front wheels 2 is also called an axle shaft. The power transmitter 13 may have a natural frequency with respect to movement in a rotational direction in which the braking torque is generated. For example, giving the output shaft of the motor 11 vibration in a rotational direction that is tuned for the natural frequency causes resonance of the power transmitter 13. This causes generation of strong vibration in the rotational direction, from the output shaft of the motor 11 to the front wheels 2. In what follows, a frequency component that is tuned for the natural frequency is called a resonance frequency component.

The wheel speed sensors 15 may detect rotation speeds of the plurality of the respective front wheels 2 and the plurality of the respective rear wheels 3, and output detection values to the ECU 20.

The inverter circuit 17 may convert electric power of the high-voltage battery 19, and output resultant power to the motor 11, to drive the motor 11. Changing a phase or timing of the power converting operation makes it possible to change the driving torque to be outputted from the motor 11. Moreover, the inverter circuit 17 may extract the regenerative electric power from the motor 11, and accumulate the regenerative electric power in the high-voltage battery 19. Thus, the braking torque is generated in the motor 11. In extracting the regenerative electric power, changing the phase or the timing of the power converting operation makes it possible to change magnitude of the regenerative electric power and the braking torque to be generated in the motor 11.

The resolver 16 may detect a rotation angle of the motor 11, and output a detection value to the inverter circuit 17 and to the ECU 20. On the basis of the detection value, the inverter circuit 17 may be able to perform a driving control or a braking control, in accordance with a rotation speed of the motor 11. Moreover, on the basis of the detection value, the ECU 20 may make a measurement of magnitude of the resonance of the power transmitter 13.

The driving operation unit 31 may include a brake pedal that performs braking of the vehicle 1. The driving operation unit 31 may further include an accelerator pedal, a steering wheel with which steering is made, a shift lever or a shift switch for gear change. Amounts of operation or positions of operation of the above-recited elements of the driving operation unit 31 may be transmitted to the ECU 20, as a driving operation signal as illustrated in FIG. 2.

The ECU 20 may control the power converting operation of the inverter circuit 17, on the basis of driving operations and the vehicle states. Thus, a traveling control of the vehicle 1 and the braking control of the vehicle 1 may be made. In the traveling control, the ECU 20 may output a value of command torque to the inverter circuit 17. Thus, the inverter circuit 17 may drive the motor 11, to generate, in the front wheels 2, torque that corresponds to the value of the command torque. In the braking control, the ECU 20 may output a value of command braking torque to the inverter circuit 17. Thus, the inverter circuit 17 may take the regenerative electric power from the motor 11, to generate, in the front wheels 2, the braking torque that corresponds to the value of the command braking torque.

Furthermore, the ECU 20 may execute an anti-lock control and a control of the resonance of the power transmitter 13. The anti-lock control includes suppressing the front wheels 2 from being locked, in the braking of the vehicle 1.

Figure 2:
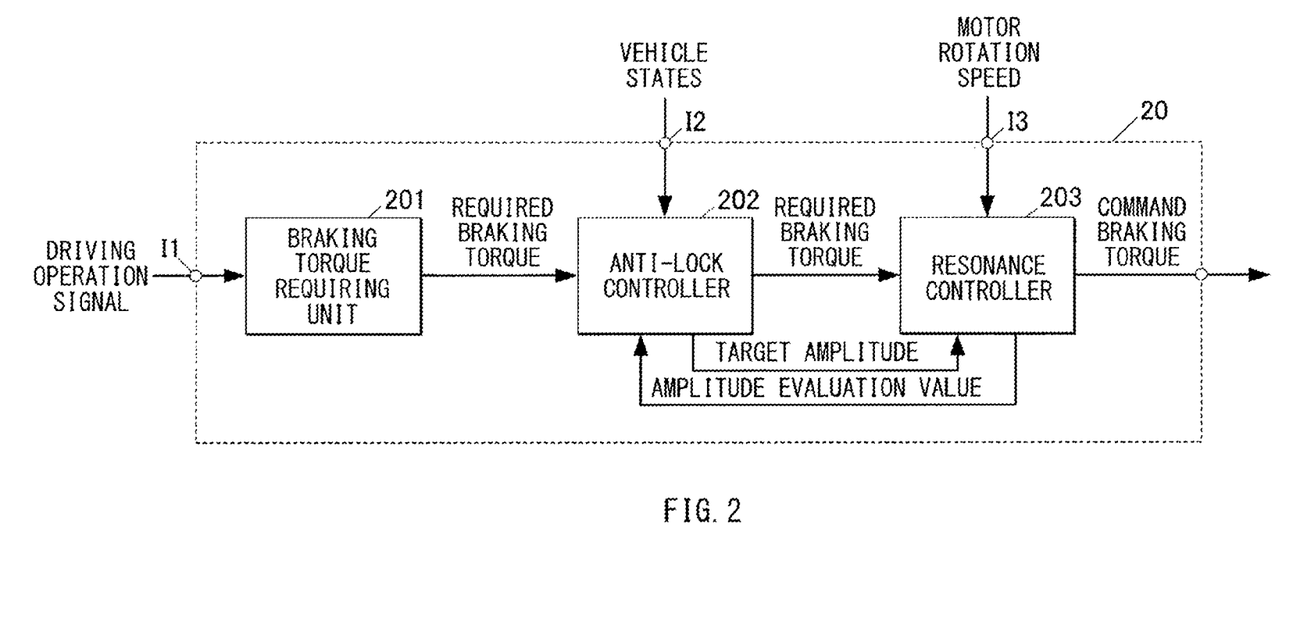
FIG. 2 is a functional block diagram that illustrates a configuration related to a braking control of an ECU according to the first implementation.

FIG. 2 is a functional block diagram of a configuration related to the braking control of the ECU.

The ECU 20 may include a braking torque requiring unit 201, an anti-lock controller 202, and a resonance controller 203, as the configuration related to the braking control of the vehicle 1. In one implementation of the technology, the anti-lock controller 202 may serve as an "anti-lock controller", a "resonance strength setting unit", and a "recovery processor".

The ECU 20 may be a microcomputer including a central processing unit (CPU), a non-volatile memory that stores control programs, a random access memory (RAM) as a work area, and an I/O circuit that performs input and output of signals. The ECU 20 may further include a digital circuit or an analog circuit that performs a specific function. The ECU 20 may serve as a plurality of functional blocks as mentioned above, in operative association of software executed by the CPU with hardware such as the I/O circuit and the digital circuit or the analog circuit.

The ECU 20 may be supplied with the driving operation signal, a signal indicating the vehicle states, and a signal of the rotation speed of the motor 11 from the resolver 16, through signal input terminals I1, I2, and I3. The driving operation signal may include, at least, an operation signal of the brake pedal. The signal indicating the vehicle states may include the detection values of the respective wheel speed sensors 15.

The braking torque requiring unit 201 may be supplied with the driving operation signal, calculate required braking torque, and output a resultant value. The required braking torque corresponds mainly to the amount of the operation of the brake pedal of the driving operation unit 31.

The anti-lock controller 202 may perform the anti-lock control that involves suppressing the front wheels 2 from being locked in the braking of the vehicle 1. The anti-lock controller 202 may be supplied with the signal indicating the vehicle states and the required braking torque from the braking torque requiring unit 201, and output the required braking torque adjusted by the anti-lock control. Alternatively, with the vehicle states not necessitating the anti-lock control, the anti-lock controller 202 may output the required braking torque as it is. The signal indicating the vehicle states supplied to the anti-lock controller 202 may include, for example, a signal of the rotation speeds of the front wheels 2, a signal of the rotation speeds of the rear wheels 3, and a signal of acceleration of the vehicle 1.

During the anti-lock control, the anti-lock controller 202 may output target amplitude to the resonance controller 203, in order to make a changeover of operation of the resonance controller 203. Moreover, the anti-lock controller 202 may be supplied with an amplitude evaluation value described later, from the resonance controller 203, in order to cause quick convergence of the resonance in stopping the anti-lock control. The target amplitude refers to a target value of, or a limitation value on, the magnitude of the resonance. The operation as mentioned above is described later in detail.

Figure 3:
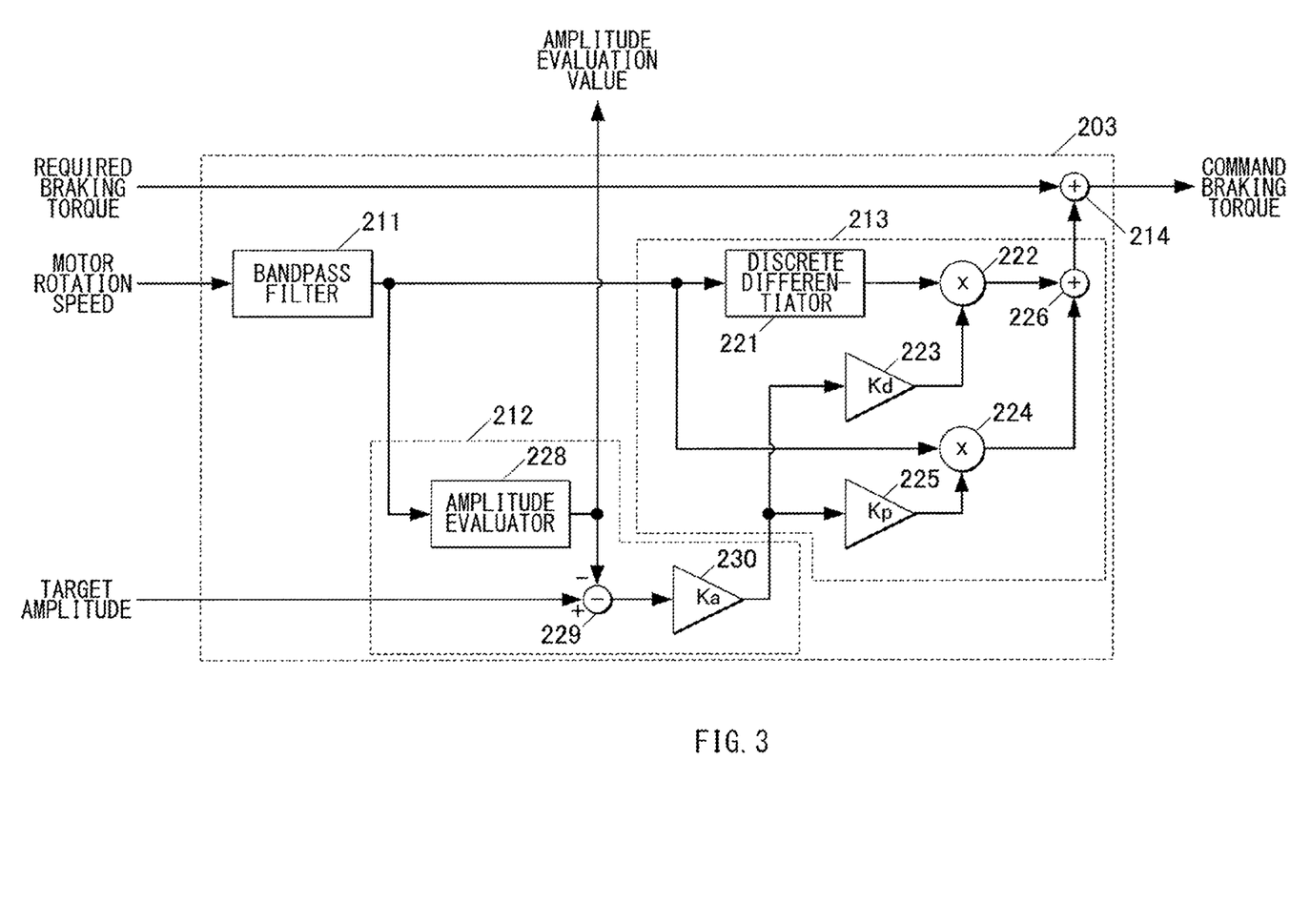
FIG. 3 is a circuit diagram that illustrates details of a resonance controller.

The resonance controller 203 may correct a value of the required braking torque, and control the resonance of the power transmitter 13. The required braking torque may be transmitted from the anti-lock controller 202. A value thus corrected may be outputted as the command braking torque to the inverter circuit 17. The correction of the required braking torque may be made by a feedback control of resonance motion of the output shaft of the motor 11. Accordingly, the resonance controller 203 may be supplied with the signal of the rotation speed of the motor 11 and a value of the target amplitude. Moreover, although details are described later, the resonance controller 203 may include an amplitude evaluator 228 as illustrated in FIG. 3. The amplitude evaluator 228 may evaluate amplitude of the resonance. The resonance controller 203 may output the amplitude evaluation value to the anti-lock controller 202.

In one implementation of the technology, the required braking torque and the command braking torque may serve as "braking torque command". The required braking torque may be braking torque command before the correction, and the command braking torque may be braking torque command after the correction.

[Details of Resonance Controller]

FIG. 3 is a circuit diagram of the resonance controller.

The resonance controller 203 may include a bandpass filter 211, a resonance generation processor 212, a PD controller 213, and an adder 214.

The bandpass filter 211 may transmit the resonance frequency component of the power transmitter 13 out of the signal of the rotation speed of the motor 11, and output a resultant signal to a subsequent stage. In what follows, the resultant signal is called a resonance signal. The bandpass filter 211 may include, for example, a digital filter.

The PD controller 213 may perform the feedback control that involves feeding back a proportional component and a differential component of the resonance signal, and causing quick convergence on zero of the resonance signal included in the required braking torque.

In one specific but non-limiting example, with a base gain Ka being a reference value, amplifiers 223 and 225 may respectively output a proportional gain Kp and a differential gain Kd that are set in advance. A discrete differentiator 221 may perform differential calculation of the resonance signal. A multiplier 222 may multiply a calculation result of the resonance signal by the differential gain Kd, and output a multiplication result. A multiplier 224 may multiply the resonance signal by the proportional gain Kp, and output the proportional component of the resonance signal. An adder 226 may perform an addition of the proportional component and the differential component of the resonance signal, and output an addition result as a feedback signal. The adder 214 may add the feedback signal to the required braking torque, to generate the command braking torque. As the proportional gain Kp and the differential gain Kd, optimal values may be set in advance, to cause the quick convergence on zero of the resonance signal. Such values may be determined by, for example, simulation, at the time of design.

Meanwhile, the PD controller 213 may change the proportional gain Kp and the differential gain Kd from the optimal values, to delay the convergence of the resonance signal, and to have an effect of releasing the suppression of the resonance.

The resonance generation processor 212 may add modulation to the PD controller 213, to perform processing that includes delaying the convergence of the resonance signal to allow the resonance signal to occur, while imposing a limitation on magnitude of the resonance signal. To allow the resonance signal to occur with the predetermined magnitude means to generate the resonance of the power transmitter 13 with the predetermined magnitude. The resonance generation processor 212 may include the amplitude evaluator 228, a subtracter 229, and an amplifier 230. The amplifier 230 may output the base gain Ka. In one implementation of the technology, the amplitude evaluator 228 may serve as a "resonance evaluator".

The amplitude evaluator 228 may evaluate the amplitude of the resonance signal, and output an evaluated value. Hereinafter, the evaluated value is referred to as the "amplitude evaluation value". As an evaluation method of the amplitude, adopted may be, for example, a method that includes calculating a difference between a local maxima and a local minima of the resonance signal from which a noise component is removed by a moving-average method. The amplitude evaluation value may be outputted not only to the subtracter 229 but also to the anti-lock controller 202 as illustrated in FIG. 2.

The subtracter 229 may calculate a difference between the amplitude evaluation value and the target amplitude, and output the difference to the amplifier 230. The target amplitude may be outputted from the anti-lock controller 202.

The amplifier 230 may generate the base gain Ka. The base gain Ka may change the proportional gain Kp and the differential gain Kd of the PD controller 213 at the same rate. The base gain Ka may change in accordance with an output of the subtracter 229. As one example, with an input value being zero or less, the amplifier 230 may set the base gain Ka at a reference value "1". With the input value increasing, the amplifier 230 may change the base gain Ka to a value smaller than the reference value "1".

In the resonance controller 203 with the forgoing configuration, with the target amplitude being zero, the base gain Ka may be "1", while the proportional gain Kp and the differential gain Kd may take the optimal values. Thus, in the PD controller 213, the feedback control may be made, to cause the quick convergence of the resonance signal. Meanwhile, with the target amplitude increasing to any value, the base gain Ka may lower, while the proportional gain Kp and the differential gain Kd may lower from the optimal values. Thus, in the PD controller 213, the feedback control may be made, to delay the convergence of the resonance signal. Here, with the resonance signal increasing to cause the amplitude evaluation value to approximate to the target amplitude, the input value of the amplifier 230 may change toward zero, and the base gain Ka may also change toward "1". Thus, the PD controller 213 may change the control again to cause the convergence of the resonance signal. Accordingly, setting the target amplitude at other than zero makes it possible to perform the feedback control that includes generating the resonance signal at a level that is not higher than the target amplitude.

It is to be noted that FIG. 3 illustrates an example with application of a PD control or a proportional differential control to the resonance controller 203. Keeping from performing a feedback of an integral component such as a PID control or a proportional integral differential control makes it possible to suppress the command braking torque from being larger than the required braking torque. Moreover, controlling the required braking torque to be equal to or smaller than upper limit braking torque makes it possible to easily keep the command braking torque from being larger than the upper limit braking torque of the motor 11. Depending on a setting method of the required braking torque, however, the PID control may be applied to the resonance controller 203.

[Anti-Lock Control Processing]

Figure 4:
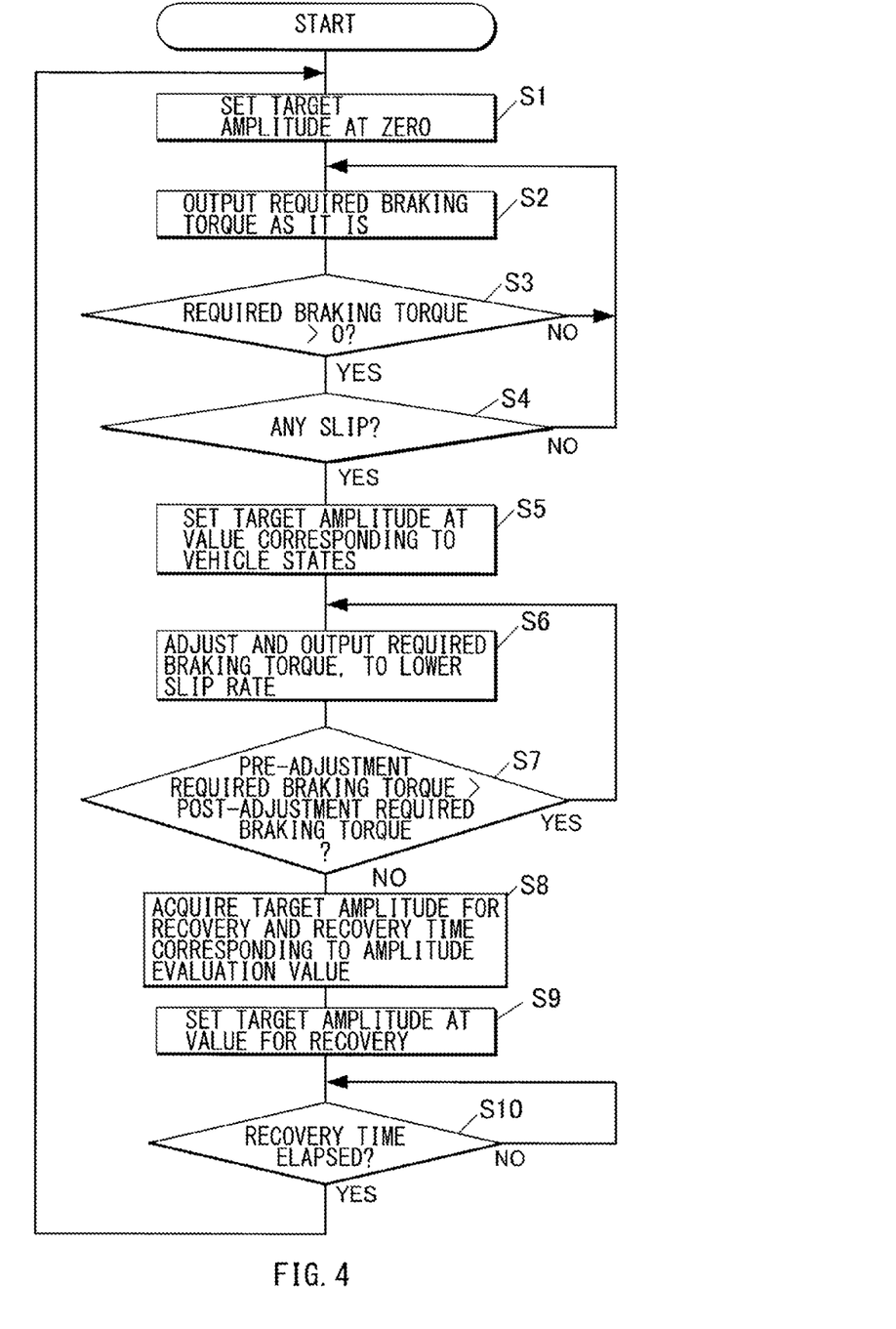
FIG. 4 is a flowchart of a procedure of anti-lock control processing to be executed by an anti-lock controller.

FIG. 4 is a flowchart of a procedure of the anti-lock control processing to be executed by the anti-lock controller.

The anti-lock control processing may be processing that is started upon start-up of the vehicle 1, and is constantly executed during travel. Upon a start of the anti-lock control processing, first, the anti-lock controller 202 may set the target amplitude at zero (step S1).

Thereafter, the anti-lock controller 202 may proceed to loop processing of a non-anti-lock control (steps S2 to S5). In the loop processing, first, the anti-lock controller 202 may output, to the resonance controller 203, the required braking torque transmitted from the braking torque requiring unit 201, as it is (step S2). Thereafter, the anti-lock controller 202 may perform a determination as to whether or not the required braking torque is a value larger than zero (step S3), and a determination as to whether or not any slip has occurred in the front wheels 2 on the basis of information on the vehicle states (step S4). The determination as to the slip may be made, with the use of a known slip determination, on the basis of the information on the vehicle states, e.g., the wheel speed of the front wheels 2, the wheel speed of the rear wheels 3, and the acceleration of the vehicle 1. For example, a slip rate may be obtained as follows. A speed and a turning radius of the vehicle 1 may be predicted on the basis of the information on the vehicle states. In accordance with the movement of the vehicle 1, calculations may be made as to a difference between a peripheral speed in a non-slip state of the front wheels 2 and an actual peripheral speed of the front wheels 2, to obtain the slip rate.

In the loop processing of steps S2 to S4, in a case with the required braking torque being zero, or in a case with no slip having occurred in the front wheels 2, the anti-lock controller 202 may repeat the loop processing. Meanwhile, in a case with the required braking torque being larger than zero, and the determination having been made as to the occurrence of the slip in the front wheels 2, the anti-lock controller 202 may terminate the loop processing of steps S2 to S4, and proceed to subsequent processing.

Upon proceeding to the subsequent processing, first, the anti-lock controller 202 may set the target amplitude at a value in accordance with the vehicle states (step S5). In one implementation of the technology, the anti-lock controller 202 that performs the processing of step S5 may serve as the "resonance strength setting unit". Setting the target amplitude at a value larger than zero allows the resonance controller 203 to cause the resonance of the power transmitter 13, with the magnitude of the resonance being limited to the target amplitude. The occurrence of the resonance causes vibration to be transmitted to the driver, during the anti-lock control (steps S6 and S7) to be subsequently executed. This makes it possible to allow the driver to recognize execution of the anti-lock control.

The target amplitude of step S5 may be set at, for example, a first amplitude value in a case where the speed of the vehicle 1 is smaller than a first reference value, e.g., 40 km/h, and be set at, for example, a second amplitude value smaller than the first amplitude value in a case where the speed of the vehicle 1 is larger than the first reference value. Here, the first reference value may be, for example, a value that is large enough to be recognized by the driver, and that falls within a range in which the vehicle 1 is not affected by the resonance. The second reference value may be a value small enough to keep traveling stability from being affected by the resonance.

It is to be noted that a setting value of the target amplitude may be changeable in various ways according to configurations of the vehicle 1. For example, for the vehicle of a configuration of high traveling stability, the target amplitude may be set at a larger value as the speed of the vehicle 1 becomes higher. For example, the target amplitude may be set at a third amplitude value in a case where the speed of the vehicle 1 is smaller than the first reference value, e.g., 40 km/h, and be set at a fourth amplitude value larger than the third amplitude value in a case where the speed of the vehicle 1 is larger than the first reference value. Such setting makes it possible to allow the driver to recognize moderate vibration by weak resonance, in a case where the speed of the vehicle 1 is low enough to easily transmit the vibration to the driver, and makes it possible to allow the driver to recognize the vibration by strong resonance, in a case where the speed of the vehicle 1 is too high to transmit the vibration to the driver.

Otherwise, the setting method of the target amplitude in accordance with the vehicle states may be changeable in various ways. For example, the target amplitude may be set at zero in consideration of undesired influences on the traveling stability, in a case where the speed of the vehicle 1 is higher than a predetermined value, e.g., 60 km/h. Moreover, the vehicle states may include not only the speed of the vehicle 1 but also the turning radius and the slip rate of each of the front wheels 2 and the rear wheels 3. In accordance with these values, the target amplitude may be determined, to keep the traveling stability from being affected.

Thereafter, the anti-lock controller 202 may calculate the required braking torque, from the information on the vehicle states, to allow the slip rate of the front wheels 2 to fall within a range in which high braking power is obtained. The anti-lock controller 202 may output the required braking torque thus calculated, as post-adjustment required braking torque (step S6). The adjustment processing may correspond to the anti-lock control.

Thereafter, the anti-lock controller 202 may determine whether or not the post-adjustment required braking torque is smaller than pre-adjustment required braking torque, i.e., the required braking torque transmitted from the braking torque requiring unit 201 (step S7). In a case where the post-adjustment required braking torque is smaller, the flow may return to step S6. In other words, in a case where the adjustment of reduction in the required braking torque continues, the processing of the anti-lock control of step S6 is repetitively executed by the loop processing of steps S6 and S7. This makes it possible to keep the front wheels 2 from being locked, and to generate large braking power, in a case where a braking control in response to an operation of the brake pedal causes the front wheels 2 to be locked, causing a failure in obtaining large braking power.

Meanwhile, in the loop processing of steps S6 and S7, for example, in a case where the operation of the brake pedal is weakened, or in a case where the speed of the vehicle 1 lowers to bring the slip rate of the front wheels 2 to zero, the determination in the determination processing step 7 may be made that the post-adjustment required braking torque is not smaller than the pre-adjustment required braking torque (NO in step S7). Thus, the anti-lock controller 202 may terminate the loop processing and proceed to subsequent processing.

Upon terminating the loop processing, the anti-lock controller 202 may acquire target amplitude for recovery and recovery time, on the basis of the amplitude evaluation value transmitted from the resonance controller 203 (step S8). Here, the target amplitude for the recovery means target amplitude that makes it possible to attenuate the resonance of the power transmitter 13 more quickly than a case where the target amplitude is set at zero, when the resonance controller 203 causes the convergence of the resonance from a state with the resonance being generated. The recovery time means time it takes to cause such convergence. The proportional gain Kp and the differential gain Kd in the suppression of the resonance in the PD controller 213 may be optimized, to cause the quick convergence of the resonance frequency component in a range with weak resonance. Accordingly, in a case with relatively strong resonance, allowing the proportional gain Kp and the differential gain Kd to take different values makes it possible to cause the quicker convergence of the resonance. The target amplitude for the recovery as mentioned above may provide setting of the base gain Ka that makes it possible to cause the quicker convergence of the resonance, in the state with the relatively strong resonance. The target amplitude for the recovery and the recovery time in accordance with the amplitude evaluation value as mentioned above may be obtained in advance by, for example, simulation, and be stored as control data in the anti-lock controller 202.

Upon acquiring the target amplitude for the recovery and the recovery time, the anti-lock controller 202 may set the target amplitude at the target amplitude for recovery (step S9), and clock the time for the recovery (step S10). Such processing makes it possible to cause the quick convergence on zero of the resonance upon the stop of the anti-lock control. In one implementation of the technology, the anti-lock controller 202 that performs the processing of steps S8 to S10 may serve as the "recovery processor".

Thereafter, the anti-lock controller 202 may return the processing to step S1, and repeats the processing from step S1 again.

As described, in the vehicle 1 and the ECU 20 of this implementation, it is possible to perform the braking of the vehicle 1 in accordance with the driving operation, by electric power regeneration of the motor 11. Furthermore, in normal braking, the resonance of the power transmitter 13 is suppressed by the control of the resonance controller 203 of the ECU 20, even in a case where the required braking torque includes a fluctuation in the resonance frequency component when the braking torque is transmitted to the front wheels 2 from the motor 11. Moreover, in the vehicle 1 and the ECU 20 of this implementation, the anti-lock control is executed by the anti-lock controller 202, in a state in which the required braking torque based on the driving operation is so large that the front wheels 2 are locked in the braking. The anti-lock control includes suppressing the front wheels 2 from being locked. Hence, it is possible to avoid loss of a steering control of the vehicle 1, and to obtain the large braking power from the front wheels 2.

Meanwhile, applying the anti-lock control to an electrical braking system that performs the power regenerative braking leads to enhanced quietness, as compared to a case with application of the anti-lock control to a mechanical braking system. In the vehicle 1 and the ECU 20 of this implementation, however, during the anti-lock control, the control of the resonance by the resonance controller 203 causes the resonance the magnitude of which is limited on the basis of the target amplitude to occur in the power transmitter 13. This makes it possible for the driver to recognize that the anti-lock control is in operation. Accordingly, it is possible for the driver to recognize what to do to operate a brake pedal appropriately, when they intend for prompt braking of the vehicle 1. For example, the driver can recognize that they should keep on stepping down the brake pedal without pumping brake operation. Furthermore, it is unnecessary to provide an additional new vibrator in order to make the driver recognize, by the vibration, that the anti-lock control is in operation. This makes it possible to avoid an increase in component costs, or an increase in space for installation of components. Moreover, during the anti-lock control, the resonance controller 203 generates the resonance of the power transmitter 13, while imposing a limitation on the magnitude of the resonance. Hence, it is possible to suppress the motor 11 or the power transmitter 13 from being affected by the resonance.

Moreover, in the vehicle 1 and the ECU 20 of this implementation, the resonance controller 203 may include the amplitude evaluator 228, and perform the control of the resonance, to bring the amplitude evaluation value to the target amplitude. The amplitude evaluator 228 may evaluate the amplitude of the resonance. With this configuration, it is possible for the ECU 20 to impose the limitation on the magnitude of the resonance easily and surely, in generating the resonance during the anti-lock control.

Furthermore, in the vehicle 1 and the ECU 20 of this implementation, the anti-lock controller 202 may change the value of the target amplitude in accordance with the vehicle states, in generating the resonance during the anti-lock control. Hence, it is possible to generate the resonance with the appropriate magnitude, in accordance with changes such as a change in a degree of transmission of the vibration to the driver in accordance with the vehicle states, and a change in the traveling stability of the vehicle 1 in accordance with the vehicle states.

In addition, in the vehicle 1 and the ECU 20 of this implementation, the anti-lock controller 202 may output the target amplitude for the recovery to the resonance controller 203, on the basis of the amplitude evaluation value of the resonance, in a case where the anti-lock control is released in a state with the resonance being generated. This causes the required braking torque to be corrected for the recovery, allowing for the quick convergence on zero of the resonance. Hence, it is possible to avoid undesired influences on the vehicle or the traveling stability by continuation of the resonance. Furthermore, a quick stop of the resonance makes it possible to make the driver quickly recognize a stop of the anti-lock control.

Second Implementation

Figure 5:
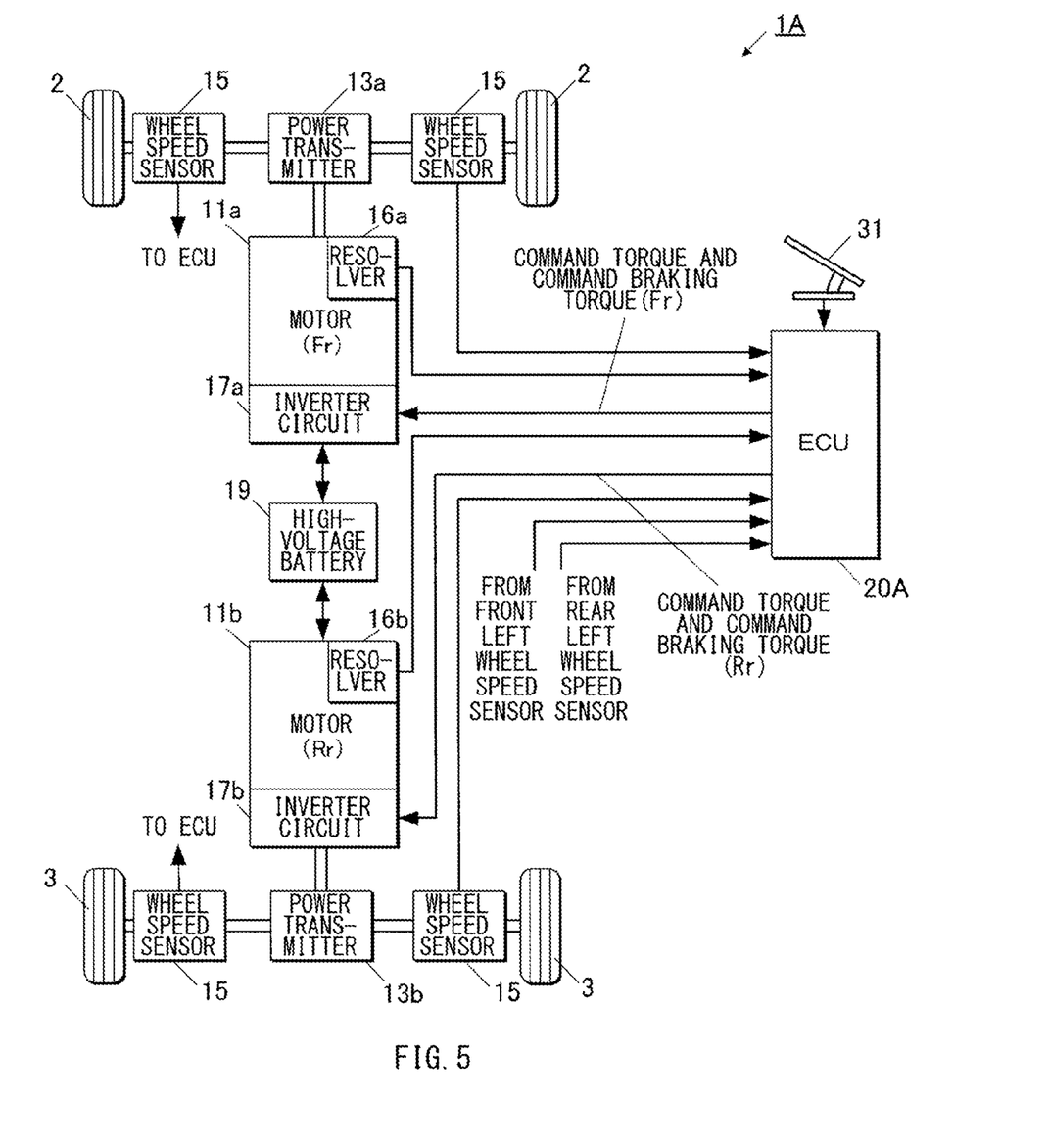
FIG. 5 is a block diagram that illustrates a configuration of a vehicle according to a second implementation of the technology.
Figure 6:
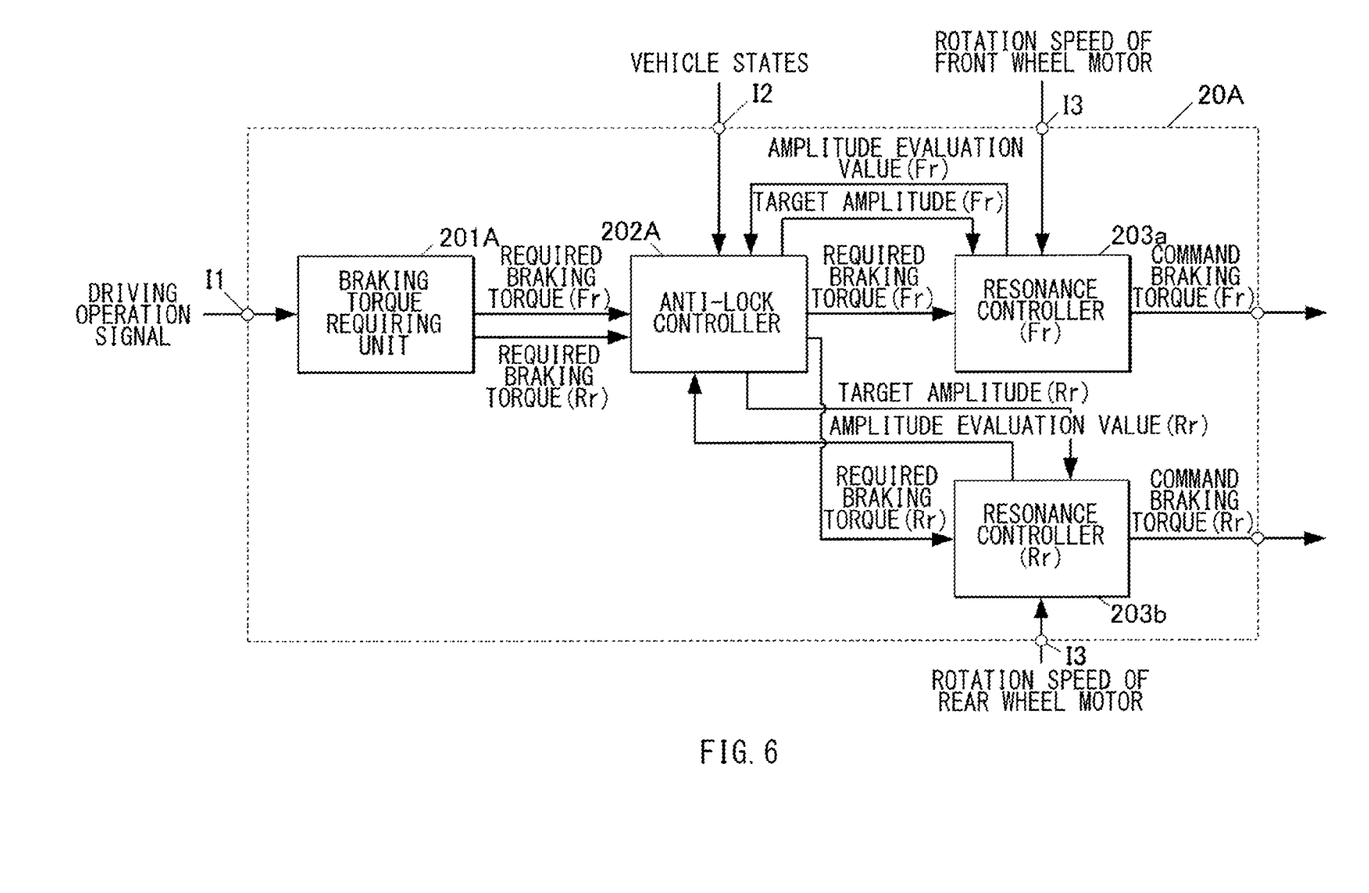
FIG. 6 is a functional block diagram that illustrates a configuration related to a braking control of an ECU according to the second implementation.

FIG. 5 is a block diagram of a configuration of a vehicle according to a second implementation of the technology. FIG. 6 is a functional block diagram of a configuration related to a braking control of an ECU according to the second implementation. In FIGS. 5 and 6, "Fr" means "for front wheels", and "Rr" means "for rear wheels".

A vehicle 1A according to the second implementation differs from the first implementation, mainly in that the vehicle 1A may include two motors 11a and 11b, and be able to generate the braking torque by the regenerative electric power respectively in the front wheels 2 and the rear wheels 3. Similar constituent elements to those of the first implementation are denoted by the same reference characters, and detailed description thereof is omitted.

The vehicle 1A according to the second implementation may include a plurality of power transmitters 13a and 13b, a plurality of resolvers 16a and 16b, and a plurality of inverter circuits 17a and 17b, in association with the plurality of the motors 11a and 11b. Their respective configurations may be similar to those of the motor 11, the power transmitter 13, the resolver 16, and the inverter circuit 17 of the first implementation. In one implementation of the technology, an armature incorporated in the motor 11a may serve as a "first armature". In one implementation of the technology, an armature incorporated in the motor 11b may serve as a "second armature".

Referring to FIG. 6, an ECU 20A according to the second implementation may include a braking torque requiring unit 201A, an anti-lock controller 202A, a resonance controller 203a for the front wheels 2, and a resonance controller 203b for the rear wheels 3. The resonance controllers 203a and 203b may have similar configurations to those of the resonance controller 203 of the first implementation.

The braking torque requiring unit 201A may calculate required braking torque for the front wheels 2 and required braking torque for the rear wheels 3, on the basis of the driving operation signal. The braking torque requiring unit 201A may output them to the anti-lock controller 202A.

The anti-lock controller 202A may perform the anti-lock control, to suppress the front wheels 2 and the rear wheels 3 from being locked. In other words, the anti-lock controller 202A may reduce the required braking torque for the front wheels 2, when the front wheels 2 are likely to be locked. The anti-lock controller 202A may reduce the required braking torque for the rear wheels 3, when the rear wheels 3 are likely to be locked. A reduction method of the required braking torque for the front wheels 2 and the required braking torque for the rear wheels 3 may be similar to that of the first implementation, except that the calculations may be made separately for the required braking torque for the front wheels 2 and the required braking torque for the rear wheels 3.

Moreover, during the anti-lock control targeted at one or both of the front wheels 2 and the rear wheels 3, the anti-lock controller 202A may output the target amplitude to both the resonance controller 203a for the front wheels 2 and the resonance controller 203b for the rear wheels 3, to cause the resonance of the power transmitters 13a and 13b. The anti-lock controller 202A may determine the target amplitude to be outputted to each of the resonance controller 203a for the front wheels 2 and the resonance controller 203b for the rear wheels 3, by target amplitude allocation processing described below.

Figure 7:
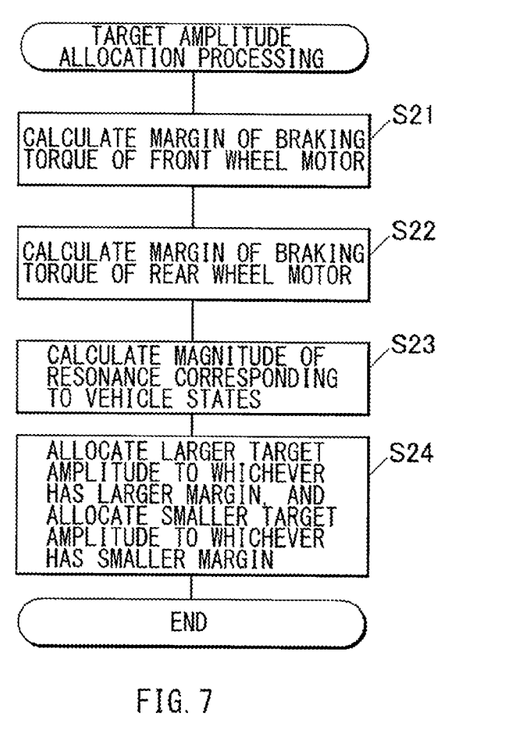
FIG. 7 is a flowchart of a procedure of target amplitude allocation processing to be executed by an anti-lock controller according to the second implementation.

FIG. 7 is a flowchart of a procedure of the target amplitude allocation processing to be executed by the anti-lock controller according to the second implementation.

The target amplitude allocation processing may be executed by the anti-lock controller 202A before a transition to the anti-lock control. Upon a start of the target amplitude allocation processing, first, the anti-lock controller 202A may subtract post-adjustment required braking torque for the front wheels 2 from upper limit braking torque of the motor 11a for the front wheels 2, to calculate a margin of braking torque of the motor 11a for the front wheels 2 (step S21). The upper limit braking torque may be a prescribed value based on a configuration and performance of the motor 11a for the front wheels 2.

Thereafter, the anti-lock controller 202A may subtract post-adjustment required braking torque for the rear wheels 3 from upper limit braking torque of the motor 11b for the rear wheels 3, to calculate a margin of braking torque of the motor 11b for the rear wheels 3 (step S22). The upper limit braking torque may be a prescribed value based on a configuration and performance of the motor 11b for the rear wheels 3.

Thereafter, the anti-lock controller 202A may calculate magnitude of the resonance corresponding to the vehicle states (step S23). Relation between the vehicle states and the magnitude of the resonance may be set in advance, to transmit vibration to the driver in a range in which the traveling stability is not hindered.

Thereafter, the anti-lock controller 202A may determine two values of the target amplitude to be allocated to the two resonance controllers 203a and 203b, to synthetically obtain, from the two power transmitters 13a and 13b, the resonance of the magnitude calculated in step S23. Here, the anti-lock controller 202A may compare the margins calculated in steps S21 and S22. The anti-lock controller 202A may allocate a larger one of the two values of the target amplitude to whichever has a larger margin, and allocate a smaller one of the two values of the target amplitude to whichever has a smaller margin (step S24). For example, the two values of the target amplitude may be calculated, to bring a ratio of the two values of the target amplitude to the same value as a ratio of the two margins. Upon allocating the two values of the target amplitude, the anti-lock controller 202A may terminate the target amplitude allocation processing of FIG. 7, and start the anti-lock control.

Upon making the transition to the anti-lock control, the anti-lock controller 202A may reduce the required braking torque of the front wheels 2 or the rear wheels 3 that are likely to be locked, and thereby adjust the slip rate of the front wheels 2 or the rear wheels 3 to within the range in which the high braking power is obtained. Moreover, during the anti-lock control, the anti-lock controller 202A may output the two values of the target amplitude to the resonance controller 203a for the front wheels 2 and to the resonance controller 203b for the rear wheels 3. Thus, the resonance is generated in the two power transmitters 13a and 13b, with the magnitude of the resonance being limited by the respective values of the target amplitude. This makes it possible for the driver to recognize that the anti-lock control is in operation, and to make an appropriate brake operation.

The generation of the resonance of the power transmitters 13a and 13b in the braking of the vehicle 1 causes a fluctuation in the braking torque caused by the resonance to be applied to the motors 11a and 11b. Here, for example, assume a case with the transition to the anti-lock control in a path of a high friction coefficient (a high μ path). In such a case, the braking torque generated in each of the motors 11a and 11b already exhibits a large value. Accordingly, there may be a case where the margin of the braking torque of either the motor 11a or the motor 11b becomes smaller. Even in such a case, the anti-lock controller 202A may perform the allocation of the target amplitude corresponding to ability of the motors 11a and 11b, to reduce the target amplitude of whichever has the smaller margin. This makes it possible to prevent an uneven increase in maximum braking torque of either the motor 11a or the motor 11b. The maximum braking torque may be an addition of the fluctuation caused by the resonance to the command braking torque. It is also possible to reduce possibility that the braking torque becomes larger than the upper limit braking torque of each of the motors 11a and 11b, even in a case where the fluctuation caused by the resonance is added to the braking torque.

As described, in the vehicle 1A and the ECU 20A of the second implementation, it is possible to allow the two motors 11a and 11b to generate the braking torque by the regenerative electric power in the front wheels 2 and in the rear wheels 3. Moreover, it is possible to generate the resonance during the anti-lock control, and to allow the driver to recognize that the anti-lock control is in operation. Furthermore, in the vehicle 1A and the ECU 20A of the second implementation, with the target amplitude allocation processing, it is possible to reduce the possibility that the maximum braking torque of each of the motors 11a and 11b to which the fluctuation caused by the resonance is added becomes larger than the upper limit braking torque, during the anti-lock control.

Although description has been made by giving the implementations as mentioned above, the contents of the technology are not limited to the above-mentioned implementations and may be modified in a variety of ways. For example, in the forgoing implementations, the PD control or the PID control are given as examples of the feedback control that includes generating the resonance, with the magnitude being limited. However, other feedback control than the PD control or the PID control may be used, to perform a control that includes generating the resonance, with the magnitude being limited. Moreover, in the forgoing implementations, as a setting example of the amplifiers 223, 225, and 230 of the feedback control, given is a setting example in which the base gain Ka is the reference value "1", with the target amplitude being zero, and the base gain Ka is shifted from the reference value, with the target amplitude is other than zero. However, a setting method of the amplifiers of the feedback control may be changeable as appropriate. For example, an alternative configuration may be possible in which a desired feedback control is performed by allowing all the amplifiers to amplify an input value simply at a predetermined gain, with the gain of each amplifier being set at a predetermined value.

Moreover, in the forgoing implementations, the resonance generation processor 212 may generate, by the feedback control, the resonance, with the magnitude of the resonance being limited to the target amplitude. In one alternative configuration, however, the resonance generation processor may generate the resonance the magnitude of which is limited, without performing the feedback control. For example, adopted may be a configuration in which during the anti-lock control, the resonance generation processor adds a signal of the resonance frequency component to the command braking torque solely for predetermined time, to generate the resonance the magnitude of which is limited. Even in a case of the continuation of the anti-lock control for a first period, setting a period of the addition of the signal at prescribed time shorter than the first period makes it possible to limit the magnitude of the resonance, and to keep the vehicle 1 from being affected by the resonance. Moreover, amplitude of the signal to be added, and the period of the addition of the signal may be changed in accordance with the vehicle states. Moreover, as conditions of a stop of the addition of the signal, other additional conditions than the time may be provided. Non-limiting examples of the additional conditions may include that the vehicle speed becomes a predetermined value, e.g., zero. In addition, instead of the addition of the signal of the resonance frequency component, adopted may be release of the processing of suppressing the resonance.

Moreover, in the forgoing implementation, description is made of a configuration in which the single motor 11 generates the braking torque in the two front wheels 2, and a configuration in which the motor 11a for the front wheels 2 generates the braking torque in the two front wheels 2 while the motor 1b for the rear wheels 3 generates the braking torque in the two rear wheels 3. However, the contents of the technology may be applied to, for example, a configuration in which four motors generate the braking torque in respective four wheels, or a configuration in which a single motor generates the braking torque in each of four wheels.

Furthermore, in the forgoing implementation, given is an example in which the contents of the technology are applied to an electric vehicle as the vehicle 1. The vehicle 1 may, however, be other vehicles such as a hybrid electric vehicle (HEV) or a fuel cell vehicle (FEV) insofar as they include an armature that electrically generates braking torque. Moreover, the braking system of the vehicle 1 may include both a configuration that electrically generates the braking torque and a configuration that mechanically generates the braking torque. In this case, the contents of the technology may be applied to the electrical generation of the braking torque. In addition, in the forgoing implementations, description is given of the power regenerative braking, as a method of electrically generating the braking torque. However, power generation braking may be also adopted. Other details described in the forgoing implementations may be modified as appropriate without departing from the scope as defined by the appended claims.

As described, according to the implementations of the technology, a resonance generation processor generates resonance while imposing a limitation on magnitude of the resonance. Hence, it is possible to allow a driver to appropriately recognize, with the resonance, that an anti-lock control is in operation, while suppressing a vehicle from being affected by the resonance. Moreover, it is unnecessary to provide an additional new vibrator, making it possible to avoid an increase in costs of the vehicle.

In one implementation described above, the ECUs 20 and 20A illustrated in FIGS. 1 and 5 may be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the ECUs 20 and 20A. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the units illustrated in FIG. 1.

Although some preferred implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A braking control device configured to be mounted in a vehicle comprising one or more wheels, at least one armature, and a power transmitter, wherein the at least one armature is configured to electrically generate braking torque on a basis of a braking torque command, wherein the power transmitter is configured to transmit the braking torque command generated by the at least one armature to the one or more wheels, and wherein the braking control device comprises:
   a signal input unit configured to receive a speed signal indicating a speed of the vehicle;
   an anti-lock controller configured to perform an anti-lock control by outputting the braking torque command to either cause suppression of the one or more wheels from being locked during braking of the vehicle when in an active mode or to not cause suppression of the one or more wheels from being locked during braking of the vehicle when in a passive mode; and
   a resonance controller configured to adjust the braking torque command to cause an amplitude of a resonance signal of the power transmitter to converge to one of a plurality of target amplitudes;
   wherein the amplitude of the resonance signal of the power transmitter converges to a first target amplitude when the anti-lock control is in the active mode and the amplitude of the resonance signal of the power transmitter converges to a second target amplitude more than the first target amplitude when the anti-lock control is in the passive mode, and
   wherein the anti-lock controller maintains the first and second target amplitudes when the speed signal is lower than a threshold speed and changes the first and second target amplitudes to higher values when the speed signal is greater than or equal to the threshold speed.

2. The braking control device according to claim 1, wherein the resonance controller comprises a resonance evaluator configured to evaluate the amplitude of the resonance signal and output an evaluation value indicating the amplitude of the resonance signal at a current time point, and wherein the resonance controller is configured adjust the braking torque command to bring the evaluation value of the resonance evaluator closer to the first target amplitude when the anti-lock control is in the active mode or closer to the second target amplitude when the anti-lock control is in the passive mode.

3. The braking control device according to claim 1, wherein the at least one armature includes a first armature and a second armature and the braking torque command is a combination of a first braking torque command corresponding to the first armature and a second braking torque command corresponding to the second armature, and wherein the resonance controller further comprises a limiter that when the resonance controller makes an adjustment to the braking torque command, the limiter places a first maximum adjustment limit to how much adjustment can be made over a predetermined time period to either the first braking torque command or the second braking torque command corresponding to whichever of the first armature and the second armature require a larger adjustment, and there is a second maximum adjustment limit, which is smaller than the first maximum adjustment limit, to how much adjustment can be made over the predetermined time period to either the first braking torque command or the second braking torque command corresponding to whichever of the first armature and the second armature require a smaller adjustment.

4. The braking control device according to claim 2, wherein the at least one armature includes a first armature and a second armature and the braking torque command is a combination of a first braking torque command corresponding to the first armature and a second braking torque command corresponding to the second armature, and wherein the resonance controller further comprises a limiter that when the resonance controller makes an adjustment to the braking torque command, the limiter places a first maximum adjustment limit to how much adjustment can be made over a predetermined time period to either the first braking torque command or the second braking torque command corresponding to whichever of the first armature and the second armature require a larger adjustment, and there is a second maximum adjustment limit, which is smaller than the first maximum adjustment limit, to how much adjustment can be made over the predetermined time period to either the first braking torque command or the second braking torque command corresponding to whichever of the first armature and the second armature require a smaller adjustment.

5. The braking control device according to claim 1, wherein the first target amplitude is set to be zero when the anti-lock control is in the active mode, and the second target amplitude is set to be greater than zero when the anti-lock control is in the passive mode.

6. The braking control device according to claim 1, wherein the resonance controller further comprises a limiter that places a maximum adjustment limit to how much adjustment can be made to the braking torque command over a predetermined time period whenever the resonance controller makes an adjustment to the braking torque command.

7. A braking control device configured to be mounted in a vehicle comprising one or more wheels, at least one armature, and a power transmitter, wherein the at least one armature is configured to electrically generate braking torque on a basis of a braking torque command, wherein the power transmitter is configured to transmit the braking torque command generated by the at least one armature to the one or more wheels, and wherein the braking control device comprises:
   a circuitry configured to:
   receive a speed signal indicating a speed of the vehicle;
   perform an anti-lock control by outputting the braking torque command to either cause suppression of the one or more wheels from being locked during braking of the vehicle when in an active mode or to not cause suppression of the one or more wheels from being locked during braking of the vehicle when in a passive mode; and
   adjust the braking torque command to cause an amplitude of a resonance signal of the power transmitter to converge to one of a plurality of target amplitudes;
   wherein the amplitude of the resonance signal of the power transmitter converges to a first target amplitude when the anti-lock control is in the active mode and the amplitude of the resonance signal of the power transmitter converges to a second target amplitude more than the first target amplitude when the anti-lock control is in the passive mode, and
   wherein the circuitry maintains the first and second target amplitudes when the speed signal is lower than a threshold speed and changes the first and second target amplitudes to higher values when the speed signal is greater than or equal to the threshold speed.

8. The braking control device according to claim 7, wherein the first target amplitude is set to be zero when the anti-lock control is in the active mode, and the second target amplitude is set to be greater than zero when the anti-lock control is in the passive mode.

9. The braking control device according to claim 7, wherein the circuitry further comprises a limiter that places a maximum adjustment limit to how much adjustment can be made to the braking torque command over a predetermined time period whenever the circuitry makes an adjustment to the braking torque command.

10. A braking control method configured to be executed within a vehicle comprising one or more wheels, at least one armature, and a power transmitter, wherein the at least one armature is configured to electrically generate braking torque on a basis of a braking torque command, wherein the power transmitter is configured to transmit the braking torque command generated by the at least one armature to the one or more wheels, and wherein the braking control method comprises:

receiving a speed signal indicating a speed of the vehicle;

performing an anti-lock control by outputting the braking torque command to either cause suppression of the one or more wheels from being locked during braking of the vehicle when in an active mode or to not cause suppression of the one or more wheels from being locked during braking of the vehicle when in a passive mode;

adjusting the braking torque command to cause an amplitude of a resonance signal of the power transmitter to converge to one of a plurality of target amplitudes, wherein the amplitude of the resonance signal of the power transmitter converges to a first target amplitude when the anti-lock control is in the active mode and the amplitude of the resonance signal of the power transmitter converges to a second target amplitude more than the first target amplitude when the anti-lock control is in the passive mode; and maintaining the first and second target amplitudes when the speed signal is lower than a threshold speed and changing the first and second target amplitudes to higher values when the speed signal is greater than or equal to the threshold speed.

11. The braking control method according to claim 10, wherein the first target amplitude is set to be zero when the anti-lock control is in the active mode, and the second target amplitude is set to be greater than zero when the anti-lock control is in the passive mode.

12. The braking control method according to claim 10, further comprising placing a maximum adjustment limit to how much adjustment can be made to the braking torque command over a predetermined time period whenever making an adjustment to the braking torque command.

* * * * *